455-278
8/2/83
XR 4,397,041

United States Patent [19]
Takeda et al.
[11] 4,397,041
[45] Aug. 2, 1983

[54] COMPLEX ANTENNA SYSTEM AND FM/AM RECEIVER

[75] Inventors: Shigeki Takeda; Junichi Shibata; Masashi Shimakata; Yasuhiro Oshime, all of Tokorozawa; Shintaro Gomi; Katsuaki Kawamura, both of Kawagoe, all of Japan

[73] Assignee: Pioneer Electronic Corporation, Tokyo, Japan

[21] Appl. No.: 241,455

[22] Filed: Mar. 3, 1981

[30] Foreign Application Priority Data

Mar. 3, 1980 [JP] Japan ..... 55-26287
Mar. 3, 1980 [JP] Japan ..... 55-26288

[51] Int. Cl.[3] ..... H04B 1/10
[52] U.S. Cl. ..... 455/277; 455/278; 343/742
[58] Field of Search ..... 343/726, 728, 744, 797, 343/867, 896; 455/277, 278

[56] References Cited

U.S. PATENT DOCUMENTS 2,256,619 9/1941 Luck ..... 343/726
2,732,551 1/1956 Kraus ..... 343/896
3,718,932 2/1973 Ikrath et al. ..... 343/728

*Primary Examiner*—Eli Lieberman
*Attorney, Agent, or Firm*—Michael J. Striker

[57] ABSTRACT

A complex antenna system including at least two loop antennas crossing each other and connected with each other at the electric neutral points thereof, and a rod antenna positioned at the central portion of the loop antennas. An FM and/or AM tuners combined with the complex antenna system utilizes selected one of the loop antennas for receiving an FM wave so as to avoid multipath noises.

8 Claims, 11 Drawing Figures

COMPLEX ANTENNA SYSTEM AND FM/AM RECEIVER

FIELD OF THE INVENTION

The present invention relates to an FM and/or AM receiver to be mounted on a vehicle such as an automobile.

BACKGROUND OF THE INVENTION

As is well known in the art, it has been a problem that an FM receiver mounted on a vehicle such as an automobile is subject to so-called "multi-path" noises during cruising of the vehicle. The multi-path noises are produced by interference between FM waves reaching a point through a plurality of different propagation paths from a broad casting station.

In a prior-art FM receiver, a plurality of rod antennas are provided the directivity characteristics of which are alternately changed by supplying thereto with frequencies differing in phase from each other. Another FM receiver is provided with a plurality of antennas spaced from each other and each having a single directivity characteristic.

However, such antenna systems as mentioned above all have so large dimensions that they are not suitable for antennas of an FM receiver on a vehicle. If, furthermore, the FM receiver is combined with an AM receiver, an antenna for AM wave must be provided in addition to the FM receiver whereby the overall antenna system occupies inappropreately wide space around the vehicle.

SUMMARY OF THE INVENTION

The present invention contemplates elimination of such a drawback inherent in the prior art antenna and receiver systems and it is, accordingly, a primary object of the present invention to provide an improved complex antenna system which is compact and robust in construction even though it has a plurality of directivity characteristics which can be selected so as to avoid "multi-path" noises.

Another object of the present invention is to provide a complex antenna system which is suitable for an antenna system for FM/AM receiver installed in a vehicle such as an automobile.

A further object of the present invention is to provide an FM/AM receiver which is compact in its electromagnetic wave receiving portion and can readily avoid multi-path noises.

In accordance with one aspect of the present invention, such objects as mentioned above are accomplished basically by a complex antenna system which comprises at least two loop antennas crossing each other, connected with each other at the neutral points thereof and having the output terminals thereof positioned closely to each other, and a rod antenna extending from a point close to the connection point of the loop antennas to a point close to the output terminals of the loop antennas.

In accordance with another aspect of the present invention, it is provided an FM/AM receiver to be mounted on a vehicle which comprises at least two loop antennas crossing each other, connected with each other at the neutral points thereof and having the output terminals thereof positioned closely to each other, a rod antenna extending from a point close to the connection points of the loop antennas to a point close to the output terminals of the loop antennas, at least two impedance matching circuit respectively connected to the output terminals of the loop antennas, and FM turner, a switching circuit for selectively connecting the impedance matching circuits to the FM tuner, and an AM tuner connected to the rod antenna.

BRIEF DESCRIPTION OF THE DRAWINGS

The features and advantages of the present invention will be more clearly understood from the following description taken in conjunction with the accompanying drawings, in which.

DETAILED DESCRIPTION OF THE EMBODIMENTS

Figure 1:
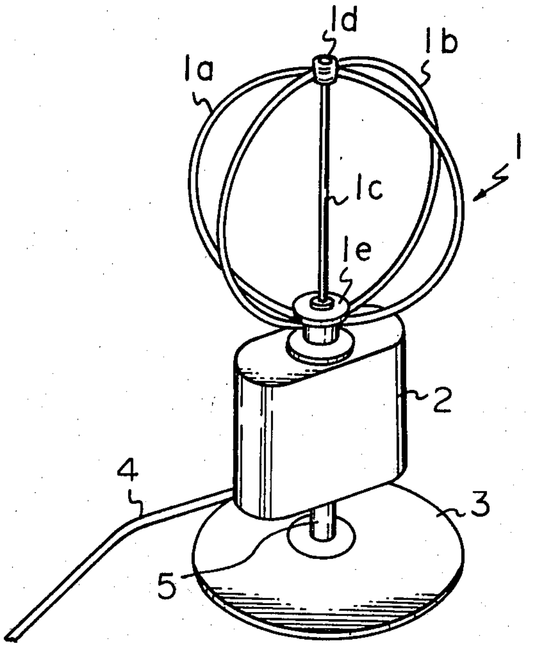
FIG. 1 is a perspective view of a complex antenna system according to the present invention.

In FIG. 1, there is shown a complex antenna system according to the present invention, which comprises a complex antenna portion 1 including two small loop antennas 1*a* and 1*b* crossing each other and connected with each other at their electric neutral points by means of an electroconductive connector 1*d*. The output terminals of the loop antennas 1*a*, 1*b* are mounted on a non-conductive connector 1*e* so that the loop antennas 1*a* and 1*b* are rigidly supported by the connector 1*e* and the output terminals of the loop antennas are positioned closely to each other. A rod antenna 1*c* is provided, and upper end of which is mechanically connected to but preferably electrically isolated from the connector 1*d*. The upper end of the rod antenna 1*c* may be connected through an inductance element (not shown) to the neutral points of the loop antennas 1*a* and 1*b*, if desired. The lower end of the rod antenna 1*c* is connected to the connector 1*e* so that the lower end of the rod antenna is positioned in the vicinity of the output terminals of the loop antennas 1*a* and 1*b*. The rod antenna 1*c* can act as a reinforcement for strengthening the overall antenna portion 1. The antenna portion 1 is mounted by means of the connector 1*e* on a case element 2 which contains therein various circuit elements (not shown) electrically connected and cooperating with the antennas 1*a*, 1*b* and 1*c*. The circuit elements are connected by means of a cable 4 to FM and AM tuners which will be described below in conjunction with FIGS. 3 and 4. The case element 2 is mounted on a supporting disc 3 by means of a support column 5. The supporting disc 3 is to be mounted on a suitable upper portion of a vehicle such as a roof of an automobile and may be provided with a thin and flat magnet on its lower surface so that the supporting disc can readily fasten on the vehicle.

Figure 2:
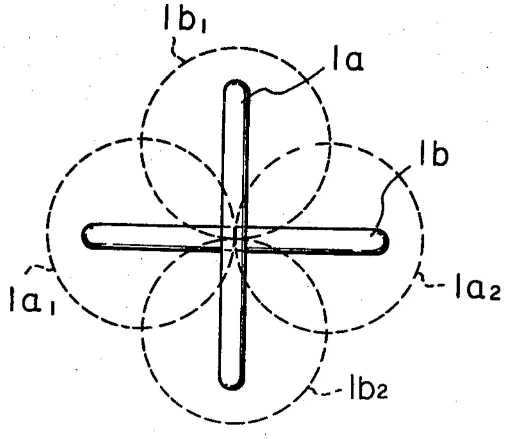
FIG. 2 is a plan view of the antennas shown in FIG. 1 for explaining the directivity characteristics of the antennas.

The loop antennas 1*a* and 1*b* cross each other rectangularly as clearly seen from FIG. 2.

In FIG. 2, there are shown in broken lines the radiation patterns $1a_1$, $1a_2$ and $1b_1$, $1b_2$ of the respective loop antennas 1*a* and 1*b* in a place parallel to the supporting disc 3.

It is clear that the maximum amplitude directions of the respective radiation patterns $1a_1$, $1a_2$ and $1b_1$, $1b_2$ cross each other rectangularly, that is, equiangularly. The antenna portion 1 according to the present invention may be provided with loop antennas more than three, if desired, in which those loop antennas cross each other substantially equiangularly so as to distribute the radiation patterns of the loop antennas uniformly.

The height of the complex antenna system shown in FIG. 1 is preferably lower than about 30 cm so that the antenna system will not adversely affect the appearance or aspect of an automobile on which the antenna system is mounted.

As will be well understood from the above, the complex antenna system according to the present invention has a plurality of radiation patterns, that is, directivity characteristics which can be selected so as to avoid multi-path noises even though the overall antenna system is compact in construction. Furthermore, the rod antenna is provided within the loop antennas and a central portion or space of the loop antennas is effectively exploited for the purpose of receiving AM waves.

Figure 3:
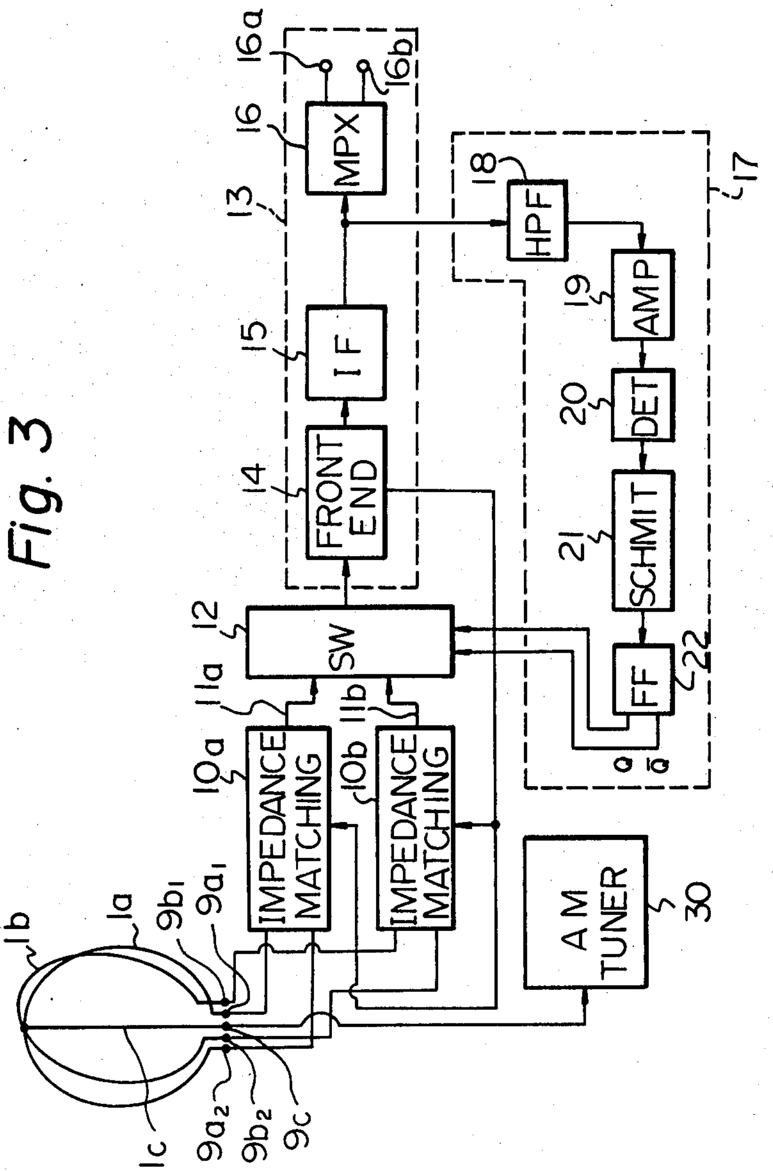
FIG. 3 is a block diagram of an FM/AM receiver combined with the complex antenna system of FIG. 1.

In FIG. 3, there is shown an FM/AM receiver which utilizes the complex antenna system shown in FIG. 1. The FM/AM receiver comprises a couple of impedance matching circuits 10*a* and 10*b* which are respectively connected with output terminals $9a_1$, $9a_2$ and $9b_1$, $9b_2$ of the loop antennas 1*a* and 1*b*. Output terminals of the impedance matching circuits 10*a* and 10*b* are respectively connected to input terminals of a change-over switching circuit 12. As is well known in the art, the impedance matching circuit 10*a* or 10*b* may include an impedance matching transformer and capacitors so that the input impedance of the impedance matching circuit 10*a* or 10*b* is equal to the output impedance of the impedance matching circuit 10*a* or 10*b* is equal to the input impedance of the next stage. Furthermore, the impedance matching circuit 10*a* or 10*b* may further include an amplifying element such as a transistor so as to obtain a sufficiently high magnitude of the received signal on the output signal thereof. The change-over switching circuit 12 interconnects a selected one of the input terminals thereof between the output terminal thereof in response to one or more control signals supplied from a noise detecting circuit 17. The output terminal of the change-over switching circuit 12 is connected to a front-end circuit 14 of an FM tuner 13. As is well known in the art, the front-end circuit 14 is comprised of a radio frequency amplifier for amplifying the received radio signal passing through the switching circuit 12, a local oscillator for producing a selected local frequency, and a mixer for mixing the received radio frequency signal with the local frequency so as to produce an IF frequency. The front-end circuit 14, in this case, produces a tuning information signal representative of the selected local frequency. The tuning information signal is supplied through a line 14*a* to the impedance matching circuits 10*a* and 10*b* which respectively change their impedances in response to the tuning information signal. The FM tuner 13 is a usual type and further includes an IF amplifier 15 connected to an output terminal of the front-end circuit 14 for amplifying the IF frequency fed from the front-end circuit 14. An output terminal of the IF amplifier 15 is connected to an input terminal of a multiplex demodulator 16 having two output terminals 16*a* and 16*b* on which L and R channel signals appear. The noise detecting circuit 17 includes a high pass filter 18 having the input terminal thereof connected to the output terminal of the IF amplifier 15. The high pass filter 18 is adapted to pass only high frequency components, that is, noise components contained in the output signal from the IF amplifier 15. The high frequency components passed through the high pass filter 18 are amplified by an amplifier 19 and to a detector 20. An output terminal of the detector 20 is connected to a schmitt trigger circuit 21 having the output terminal thereof connected to a trigger input terminal of an R-F flip-flop circuit 23. An output terminal of the flip-flop circuit 23 is connected to the change-over switching circuit 12 thereby supplying the control signal to the change-over switching circuit 12. The control signal may be a logic "1" or "0" appearing on the Q and $\overline{Q}$ terminals of the flip-flop circuit 23. The change-over switching circuit 12 may, for example, act to connect the line 11*a* with the output terminal thereof when a logic "1" is supplied from the flip-flop circuit 23 and to connect the line 11*b* with the output terminal thereof when a logic "0" is supplied from the flip-flop circuit 23.

An output terminal 9*c* of the rod antenna 1*c* is connected to an input terminal of an AM tuner 30. Since the AM tuner 30 has a usual construction and function, no explanation is given in this instance.

When, in operation, multi-path noises appears on the output terminal of the IF amplifier 15, the multi-path noises pass through the high pass filter 18 and is supplied via the amplifier 19 to the detector 20 so that the detector 20 produces one or more pulses which are supplied to a schmitt trigger circuit 21. The schmitt trigger circuit 21 then triggers the flip-flop circuit 22 which turns its condition and changes its output signals on Q and Q terminals from logic "0" to "1" or vice versa.

It is to be noted that the construction of the noise detecting circuit 17 is not limited to such circuit arrangement as shown in FIG. 3. The essential feature of the noise detecting circuit 17 is to detect the multi-path noises from the signal line in the FM tuner 13 and to produce the control signal for controlling the change-over switching circuit 12 so as to select one loop antenna which can catch an FM wave in a higher level than the others.

It is, in this instance, to be noted that the impedance matching circuits 10*a* and 10*b*, the change-over switching circuit 12 and the noise detecting circuit 17 may be accommodated within the case element 2 shown in FIG. 1, if preferred, so that the antenna unit shown in FIG. 1 can be manufactured separately from the FM or AM tuner and combined with an existing FM and/or AM tuners by users, if desired.

Figure 4:
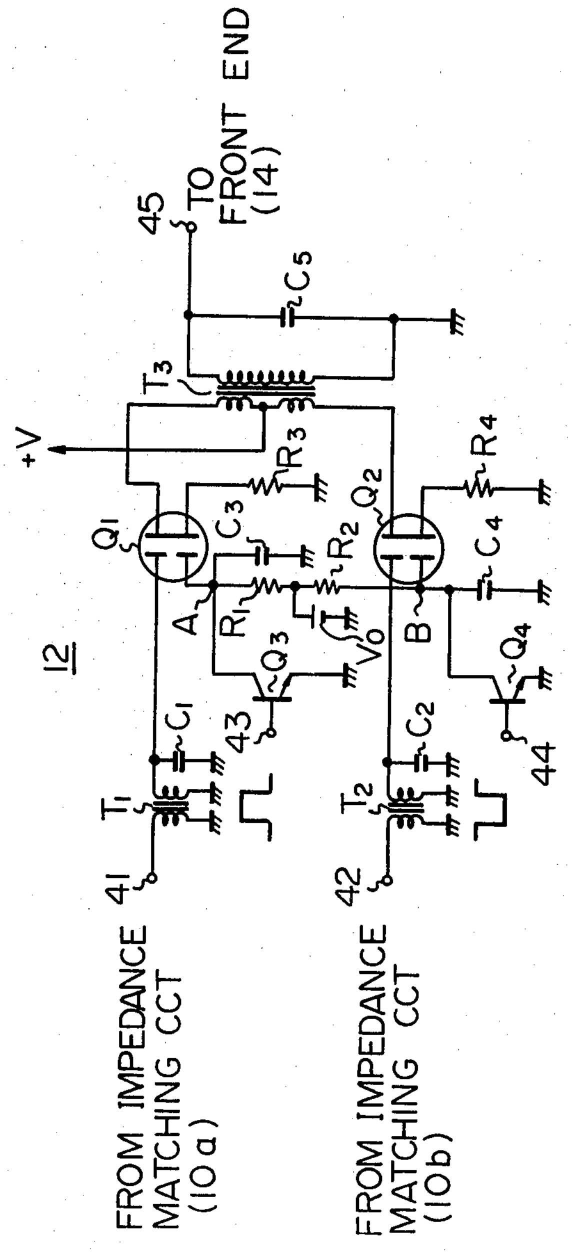
FIG. 4 is a circuit diagram of a switching circuit used in an FM/AM receiver shown in FIG. 1.

In FIG. 4, there is shown a circuit arrangement of the change-over switching circuit 12 of FIG. 3, which comprises a couple of transformer $T_1$ and $T_2$ respectively having the primary coils thereof connected via input terminals 41 and 42 to the impedance matching circuits 10*a* and 10*b*. The secondary coils of the transformer $T_1$ and $T_2$ are respectively by-passed by means of capacitors $C_1$ and $C_2$ and connected to first gates of dual-gate FETs $Q_1$ and $Q_2$. A second gate of the dual-gate FET $Q_1$ is connected to a joint A between a resistor $R_1$ and a capacitor $C_3$ which are serially connected to each other. A voltage source $V_0$ is provided for impressing a voltage $V_0$ across the series connetion of the resistor $R_1$ and the capacitor $C_3$. Both terminals of the capacitor $C_3$ are connected to emitter and collector of an NPN transistor $Q_3$ the base of which is connected to an input terminal 43. Similarly, a second gate of the dual-gate FET $Q_2$ is connected to a joint B between a resistor $R_2$ and a capacitor $C_4$ which are serially connected to each other. The voltage $V_0$ is also supplied across the series connection of the resistor $R_2$ and the capacitor $C_3$. Both terminals of the capacitor $C_4$ are connected to emitter and collector of an NPN transistor $Q_4$ the base of which is connected to an input terminal 44. The input terminals 43 and 44 may be connected to the Q and Q terminals, respectively. The source terminals of the dual-gate FETs $Q_1$ and $Q_2$ are respectively connected to the ground through a resistors $R_3$ and $R_4$. The drain terminals of the dual-gate FETs $Q_1$ and $Q_2$ are respectively connected to terminals of a primary coil of an output transformer $T_3$. To neutral point of the primary coil of the output transformer $T_3$ is supplied a voltage source +V. A capacitor $C_5$ is connected across output terminals of the secondary coil of the output transformer $T_3$. One terminal of the secondary coil of the output transformer $T_3$ is connected to an output terminal 45 and the other terminal of the secondary coil is grounded. The output terminal 45 may be connected to the input terminal of the front-end circuit 14 of the FM tuner 13.

When, in operation, the transistors $Q_3$ and $Q_4$ are alternately triggered and made conductive by control signals supplied from the noise detecting circuit 17 and differring in phase by 180°, so that the second gates of the FETs $Q_1$ and $Q_2$ are alternately grounded. In this instance, the potentials of the source terminal of the FETs $Q_1$ and $Q_2$ are maintained at a constant level by means of the resistors $R_3$ and $R_4$ and therefore either one of the FETs has a high impedance between the source and drain terminals. Accordingly, either one of the received signals passed through the impedance matching circuits 10*a* and 10*b* is applied to the output transformer $T_3$ and transferred to the FM tuner 13.

It is to be understood that the switching duration or period of the change-over switching circuit 12 should be as short as possible and the switching duration is governed by time constants of the resistors $R_1$ $C_3$ and $R_2$ $C_4$ in the case of the circuit of FIG. 4.

Figure 5:
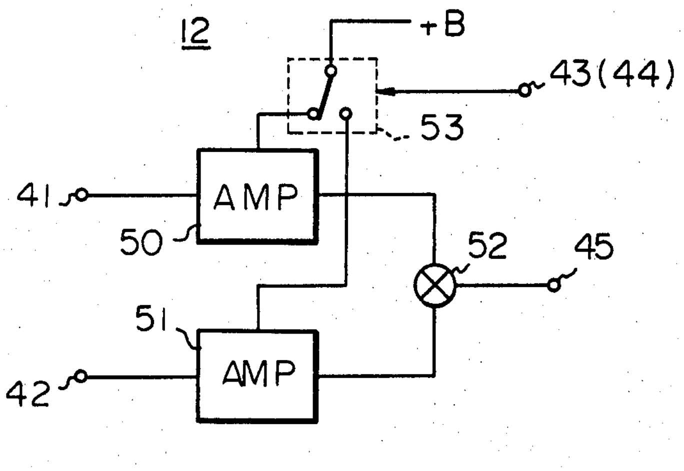
FIG. 5 is a block diagram showing another embodiment of a change-over switching circuit shown in FIG. 3.

In FIG. 5, there is shown another circuit arrangement of the change-over switching circuit 12, which includes a couple of amplifiers 50 and 51 having the input terminals thereof respectively connected to the input terminals 41 and 42. The output terminals of the amplifiers 50 and 51 are connected to input terminals of a summing circuit 52 the output terminal of which is connected to the output terminal 45. The voltage source terminals of the amplifier 50 and 51 are connected to output terminals of a switch circuit 53 an input terminal of which is connected to voltage source +B. The switch circuit 53 is adapted to selectively supply the voltage source +B to the output terminals thereof in response to the control signal deliverred through the terminal 43 or 44 from the noise detecting circuit 17, whereby either one of the amplifier 50 and 51 becomes active to pass one of the received signals from the impedance matching circuits 10*a* and 10*b* up to the output terminal 45 connected to the FM tuner 13.

Figure 6:
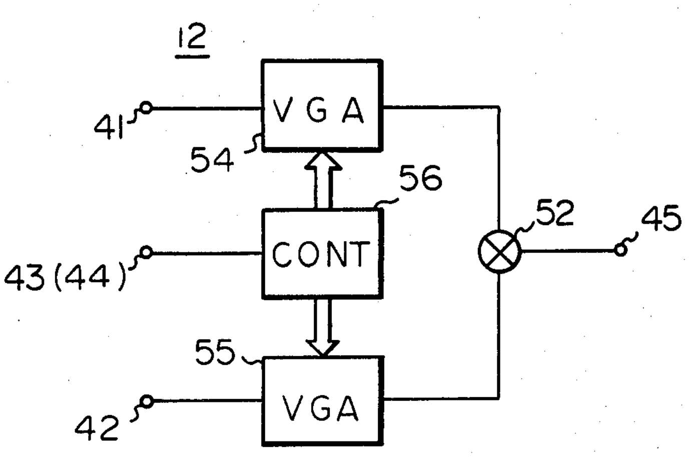
FIG. 6 is a block diagram showing still another embodiment of a change-over switching circuit shown in FIG. 3.

In FIG. 6, there is shown still another circuit arrangement of the change-over switching circuit 12, which includes a variable gain amplifiers 54 and 55 having the input terminals thereof respectively connected to the input terminals 41 and 42. The output terminals of the variable gain amplifier 54 and 55 are connected to input terminals of a summing circuit 52 the output terminal of which is connected to the output terminal 45. The gains of the amplifiers 54 and 55 are regulated by a controller 56 which in turn triggerred by the control signal from the noise detecting circuit 17.

In operation, one of the variable gain amplifiers 54 and 55 is controlled by the controller 56 to have a high gain to pass therethrough the received signal and the other amplifier is controlled to have a low gain to prohibit the received signal to pass therethrough.

Figure 7:
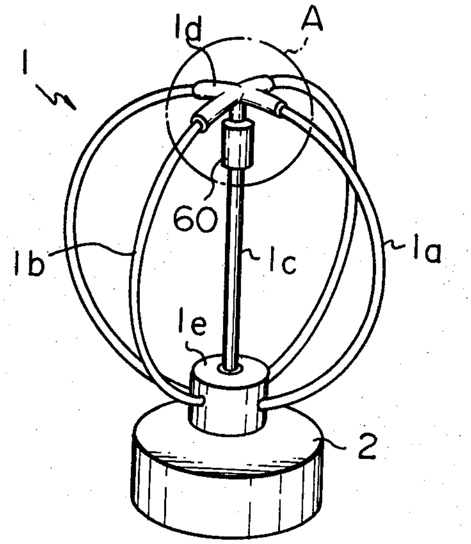
FIG. 7 is a perspective view of another embodiment of a complex antenna system according to the present invention.
Figure 8:
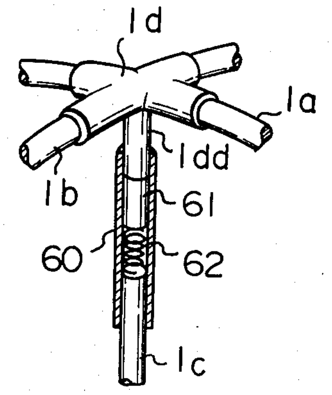
FIG. 8 is a perspective view showing a portion of the complex antenna system of FIG. 7.

In FIGS. 7 and 8, there is shown another embodiment of a complex antenna system according to the present invention, which has substantially the same construction as the complex antenna system shown in FIG. 1 except of a portion indicated by a circle A in FIG. 7. FIG. 8 clearly shows in an enlarged scale partly in section that portion A in which the connector 1*d* has a projection 1dd extending toward the upper end of the rod antenna 1*c*. The projection 1 dd is connected with the upper end of the rod antenna 1*c* by means of a non-conductive sleeve connector 60. The sleeve connector 60 holds therein a discharging or arrestor element 61 and a conductive coil spring 62 both of which are arranged in series between the end of the rod antenna 1*c* and the projection 1dd.

Figure 9:
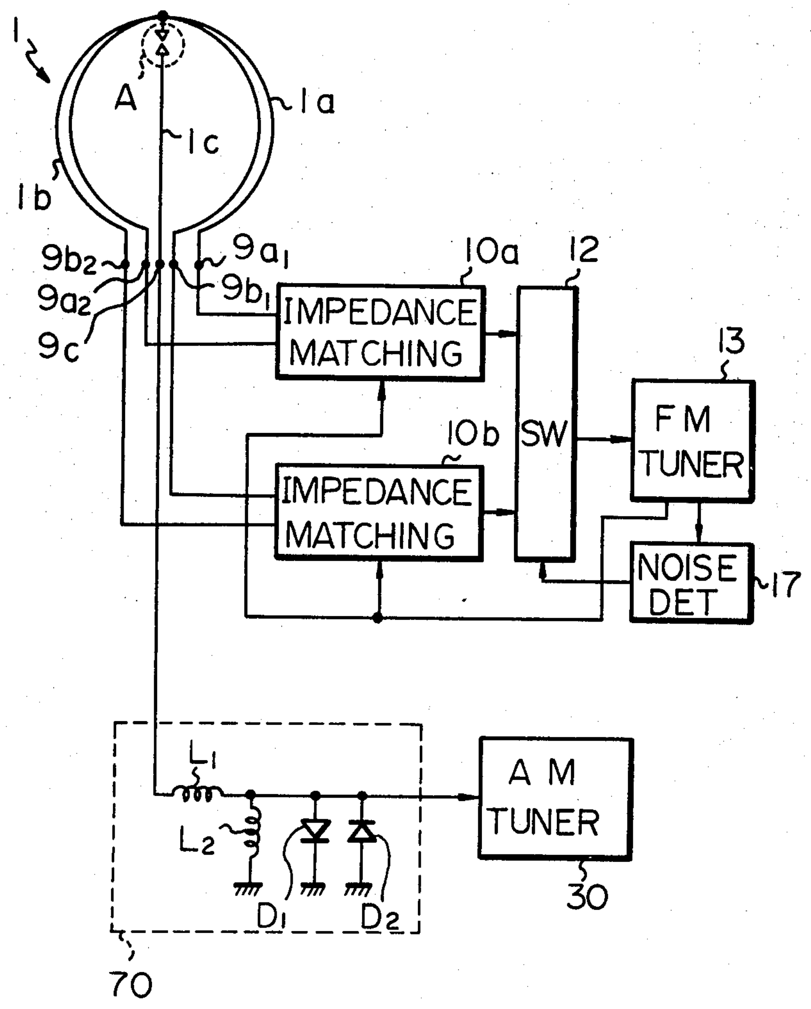
FIG. 9 is a block diagram showing an FM/AM receiver combined with the complex antenna system shown in FIGS. 7 and 8.

In FIG. 9, there is shown a receiver system which is combined with the complex antenna system shown in FIG. 7 and 8 and explained above. The receiver system of FIG. 9 is substantially the same as the receiver system shown in FIG. 3 except that the complex antenna system contains the discharging element between the rod antenna 1*c* and the loop antennas 1*a*, 1*b* and that the lower and i.e. the output terminal 9*c* of the rod antenna 1*c* is connected to the input terminal of the AM tuner 30 by way of a protecting circuit 70. The protecting circuit 70 includes inductance elements $L_1$ and $L_2$, and diodes $D_1$ and $D_2$. The protecting circuit 70 suppress peack voltages of discharged electric energy through the discharging element from the loop antennas 1*a* and 1*b* by means of the inductance elements $L_1$ and $L_2$ and then drain the electric energy to the ground by means of the diodes $D_1$ and $D_2$, thereby to prohibit dangerour high voltage power to be impressed on the input terminal of the AM turner 30.

The complex antenna system and the receiver system shown in FIGS. 7, 8 and 9 and described above are effectively protected from a high level of noises or voltages appearing on the loop antennas which will be caused by ignitions in an engine of the vehicle or a thunderbolt onto the antennas.

It is now to be noted that various types of discharging elements may be used as the discharging or arrestor element 61.

Figure 10:
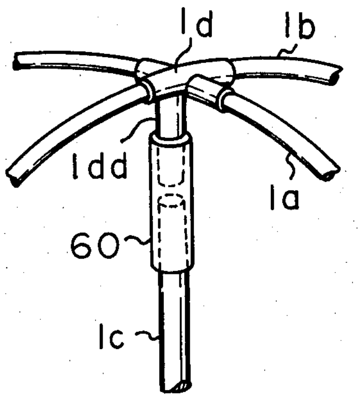
FIGS. 10 and 11 is a perspective views of modifications of the complex antenna system of FIG. 7.

FIG. 10 shows another form of complex antenna system according to the present invention which is generally the same as the complex antenna system of FIGS. 7 and 8 except that the discharging element 61 and the coil spring 62 are omitted. Thus, the upper end of the rod antenna and the projection 1dd of the connector 1*d* are maintained close to each other by means of the sleeve connector 60. By the provision of such gap between the upper end of the rod antenna 1*c* and the connector 1*d*, the rod antenna 1*c* is isolated or protected from high frequency noises caught by the loop antenna 1*a* or 1*b*.

Figure 11:
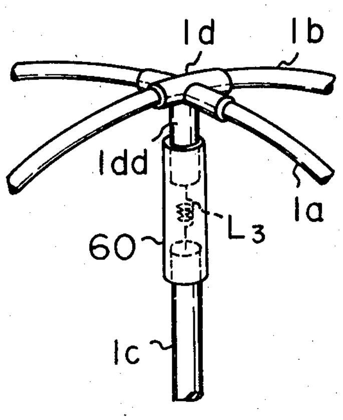

FIG. 11 shows a still other form of complex antenna system according to the present invention which is generally the same as the complex antenna system of FIG. 10 except that an induction element $L_3$ is provided within the sleeve connector 60. The induction element $L_3$ is connected at the terminals thereof with the upper end of the rod antenna 1*c* and the projection 1dd. With this arrangement, the rod antenna 1*c* is dc-coupled with the loop antenas 1*a* and 1*b* but isolated from or protected from high frequency noises on the loop antenna 1*a* or 1*b*.

When the complex antenna system shown in FIG. 10 or 11 is combined with FM and AM tuners shown in FIG. 9, the protection circuit may be omitted.

As being apparent from the foregoing description. the complex antenna system according to the present invention has a plurality of directivity characteristics differently distribute from each other and therefore the complex antenna system of the invention has the following features and advantages:

(1) To reduce multi-path noises by selectively using one antenna which has its maximum sensitivity in a direction in which a strongest or desired FM wave propagates;

(2) To suppress intermodulation since an unwanted FM wave is omitted due to the selection of the antennas;

(3) To further reduce the multi-path noises by increasing the number of loop antennas;

(4) To make small the loop antennas by combining impedance matching circuits, amplifiers, etc. with the loop antennas;

(5) To dispense with cables for interconnecting antennas since all the antennas are positioned closely to each other; and (6) To exploit the center portion of the loop antennas by placing a rod antenna, which results in robust construction and attractive shape or contour of the overall antenna system.

It will be understood that the invention is not to be limited to the exact construction shown and described and that various changes and modifications may be made without departing from the spirit and scope of the invention, as defined in the appended claims.

What is claimed is:

1. An FM receiver comprising an FM tuner (13); an antenna system (1), said antenna system including at least two loop antennas crossing each other and connected with each other at the electric neutral points thereof and having the output terminals thereof positioned closely to each other; a multipath noise detector (17) connected to said FM tuner for producing a change-over signal when it detects the multipath noises; at least two impedance matching circuits (10*a*, 10*b*) having the input terminals thereof respectively connected to the output terminals of said loop antennas; and a switching circuit (12) for alternately connecting either one of the output terminal of said impedance matching circuits to the input terminal of said FM tuner.

2. An FM receiver as claimed in claim 1, wherein the maximum sensitivity directions of said loop antennas locate equiangularly to each other.

3. An FM receiver as claimed in claim 1, wherein said loop antennas cross each other rectangularly to each other.

4. An FM receiver as claimed in claim 1, wherein said switching circuit (12) includes at least two amplifiers (50, 51, 54, 55) having the input terminals thereof respectively connected to the output terminals of said impedance matching circuits and having the output terminals thereof connected to the input terminals of said FM tuner, and a change-over circuit (53, 56) connected to said amplifiers (50, 51, 54, 55) for making said amplifiers alternately operative.

5. An FM receiver as claimed in claim 4, wherein said change-over circuit is a change-over switch element (53) for supplying alternately one of said amplifiers with a source voltage (+B) in accordance with said change-over signal.

6. An FM receiver as claimed in claim 4, wherein said amplifiers are variable gain amplifiers (54, 55) each having a gain according to a control voltage applied thereto, and said change-over circuit includes a gain controller (56) for controlling the gain of said amplifiers so as to make substantially operative alternatively one of said amplifiers in response to said change-over signal.

7. An FM receiver as claimed in claim 1, further comprising a case element supporting thereon said antenna system and carrying therein said impedance matching circuits; and support means connected to said case element for fastening said case element to a body on which the FM receiver is to be mounted.

8. An FM receiver as claimed in claim 7, wherein said case element also carries therein said switching circuit.

* * * * *